(12) United States Patent
Shindo et al.

(10) Patent No.: US 8,705,231 B2
(45) Date of Patent: Apr. 22, 2014

(54) EXTENSION DEVICE AND INFORMATION PROCESSING SYSTEM INCLUDING THE SAME

(75) Inventors: Kenichi Shindo, Osaka (JP); Jun Sato, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 196 days.

(21) Appl. No.: 13/427,926

(22) Filed: Mar. 23, 2012

(65) Prior Publication Data
US 2012/0250240 A1 Oct. 4, 2012

(30) Foreign Application Priority Data
Apr. 4, 2011 (JP) ................................. 2011-082928

(51) Int. Cl.
*G06F 1/16* (2006.01)
(52) U.S. Cl.
USPC ................... 361/679.41; 455/557; 324/56.05; 345/156
(58) Field of Classification Search
USPC ............. 455/41.1, 559, 461, 456.1, 557, 175, 455/1.3, 204, 102, 87, 211, 156, 60; 324/56.05; 361/679.02, 679.41, 361/679.21, 679.58, 679.22, 679.4, 679.55, 361/679.43, 679.49, 679.32, 679.48, 361/679.01, 679.03, 679.57, 679.34, 361/679.23; 345/173, 156, 581, 163, 161, 345/632, 175, 1.3, 204, 102, 87, 211, 60
See application file for complete search history.

(56) References Cited

U.S. PATENT DOCUMENTS

| | | | |
|---|---|---|---|
| 2004/0135839 A1* | 7/2004 | Matsuo et al. | 347/19 |
| 2010/0081377 A1* | 4/2010 | Chatterjee et al. | 455/41.1 |
| 2012/0176151 A1* | 7/2012 | Sherry et al. | 324/756.05 |
| 2012/0257342 A1* | 10/2012 | Shindo et al. | 361/679.02 |

FOREIGN PATENT DOCUMENTS

| | | |
|---|---|---|
| JP | H03-101056 U | 10/1991 |
| JP | H10-098515 A | 4/1998 |

* cited by examiner

*Primary Examiner* — Hung Duong
(74) *Attorney, Agent, or Firm* — Judge Patent Associates

(57) ABSTRACT

An information processing system includes: a main device including first and second engagement portions in a principal surface and a third engagement portion in a surface on the main-device side reverse from the principal surface; and an extension device including a placement portion on which the main device is placed, a first wall portion provided standing on one edge side of the placement portion, a second wall portion facing the first wall portion across the placement portion, a first engaging portion and a second engaging portion formed in the first wall portion, and a third engaging portion formed in the second wall portion. The first engaging portion engages the first engagement portion, the second engaging portion engages the second engagement portion, and the third engaging portion engages the third engagement portion. In the information processing system, the main device can be prevented from being improperly mounted on the extension device.

10 Claims, 12 Drawing Sheets

EXTENSION DEVICE AND INFORMATION PROCESSING SYSTEM INCLUDING THE SAME

BACKGROUND OF THE INVENTION

1. Field of the Invention

The disclosure of the present application relates to an extension device on which a main device can be mounted. The disclosure of the present application relates to an information processing system including the extension device.

2. Description of the Background Art

In recent years, because of the background such as size reduction of main device terminals, the cases where main devices and extension devices are connected to each other when being used have increased. A method for stably connecting a main device and an extension device is required. A conventional extension device has a guide rib formed along the outer shape of a main device, retains the main device with the guide rib, and guides the main device to a connection location. However, in this method, regulations are required with respect to the shape of the main device, a type of a connected connector, and the like, and have a huge effect on the layout of the main device.

Japanese Laid-Open Patent Publication No. 10-98515 (Patent Literature 1) discloses, for example, as shown in FIG. 1 of this publication, a plurality of key grooves 2*a* provided on each of both side surfaces of a terminal 2 and projections 1*a* and 1*b* on a cradle 1 side which are urged by an elastic member so as to freely extend and retract in response to engagement with each side surface and the key grooves 2*a* of the terminal 2 and are provided such that the positions of the projections 1*a* and 1*b* correspond to the positions of the key grooves 2*a* when the terminal 2 is fixed to the cradle 1. The cradle 1 disclosed in Patent Literature 1 includes a thick portion and a thin portion due to a step provided in either of a front portion or a rear portion, the projection 1*b* provided on the thin side, among the projections 1*a* and 1*b*, is formed so as to have a circular cross-sectional shape, and the terminal 2 is pressed down toward the thin side with the circular projection 1*b* as a rotating axis when the terminal 2 is removed from the cradle 1.

The microfilm of Japanese Laid-Open Utility Model Publication No. 3-101056 (Japanese Utility Model Application No. 2-8744, Patent Literature 2) discloses, for example, as shown in FIG. 1 of this publication, a portable radio 1 and a holder 2 that retains the portable radio 1. In addition, Patent Literature 2 discloses, for example, as shown in FIG. 1 of this publication, a retention structure for the portable radio in which thin grooves 11 are formed in both side surfaces of the portable radio 1, a recess 12 is formed in a back surface of the portable radio 1, the holder 2 includes a fixed portion 22 fixed within an interior of a car or the like and a holding portion 21 tiltably connected to the fixed portion 22, the holding portion 21 is provided with projections 24 engaged with the thin grooves 11 in the portable radio 1, and an engagement body 30 fitted into the recess 12 is provided in the fixed portion 22 in a state of being urged by a spring 29.

SUMMARY OF THE INVENTION

However, in the configurations disclosed in Japanese Laid-Open Patent Publication No. 10-98515 and the microfilm of Japanese Laid-Open Utility Model Publication No. 3-101056 (Japanese Utility Model Application No. 2-8744), the shape of the main device-mounted portion of the extension device has to correspond to the shape of the mounted main device, and thus it is difficult to reduce the size of the extension device.

An information processing system disclosed in the present application is an information processing system including a main device that executes information processing and an extension device that is electrically connected to the main device and mechanically retains the main device. The main device includes: a first engagement portion and a second engagement portion formed in a principal surface; and a third engagement portion formed in another surface on the main-device side reverse from the principal surface. The extension device includes: a placement portion on which the main device is placed; a first wall portion provided in a standing manner on one edge side of the placement portion; a second wall portion provided in a standing manner on another edge side of the placement portion that faces the one edge side; a first engaging portion formed in the first wall portion; a second engaging portion formed in the first wall portion; and a third engaging portion formed in the second wall portion. When the main device is mounted on the extension device, the first engaging portion engages the first engagement portion, the second engaging portion engages the second engagement portion, and the third engaging portion engages the third engagement portion.

An extension device disclosed in the present application is electrically connected to and mechanically retains a main device that includes a first engagement portion and a second engagement portion formed in a principal surface and a third engagement portion formed in another surface opposite to the principal surface. The extension device includes: a placement portion on which the main device is placed; a first wall portion provided in a standing manner on one edge side of the placement portion; a second wall portion provided in a standing manner on another edge side of the placement portion that faces the one edge side; a first engaging portion formed in the first wall portion; a second engaging portion formed in the first wall portion; and a third engaging portion formed in the second wall portion. When the main device is placed on the placement portion, the first engaging portion engages the first engagement portion, the second engaging portion engages the second engagement portion, and the third engaging portion engages the third engagement portion.

According to the disclosure of the present application, the extension device can retain a main device that can keep engagement relations at least at three locations, without depending on the outer shape of the main device. Thus, the extension device can be reduced in size.

DESCRIPTION OF THE PREFERRED EMBODIMENTS

Embodiment

An information processing system according to an embodiment includes a main device and an extension device. Hereinafter, the configuration of the main device, the configuration of the extension device, an operation when the main device is mounted onto the extension device, and the like will be described. It should be noted that in the present embodiment, a computer device including a single housing is exemplified as an example of the main device. In addition, in the present embodiment, a device that can be electrically connected to the computer device and can mechanically retain the computer device is exemplified as an example of the extension device. The extension device of the present embodiment is, for example, a device called "cradle".

1. Configuration of Computer Device

Figure 1A:
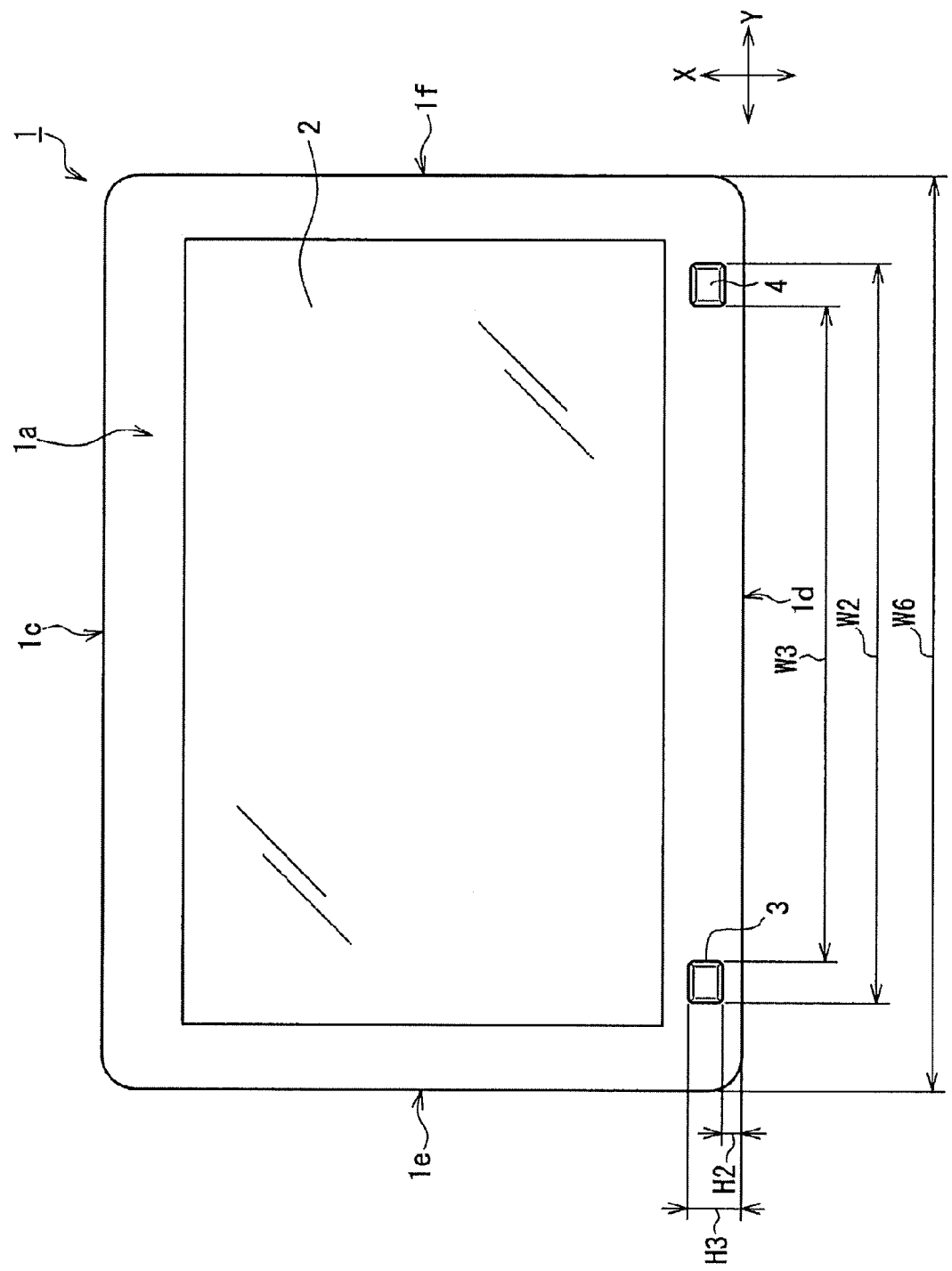
FIG. 1A is a front view of a main device according to an embodiment.
Figure 1B:
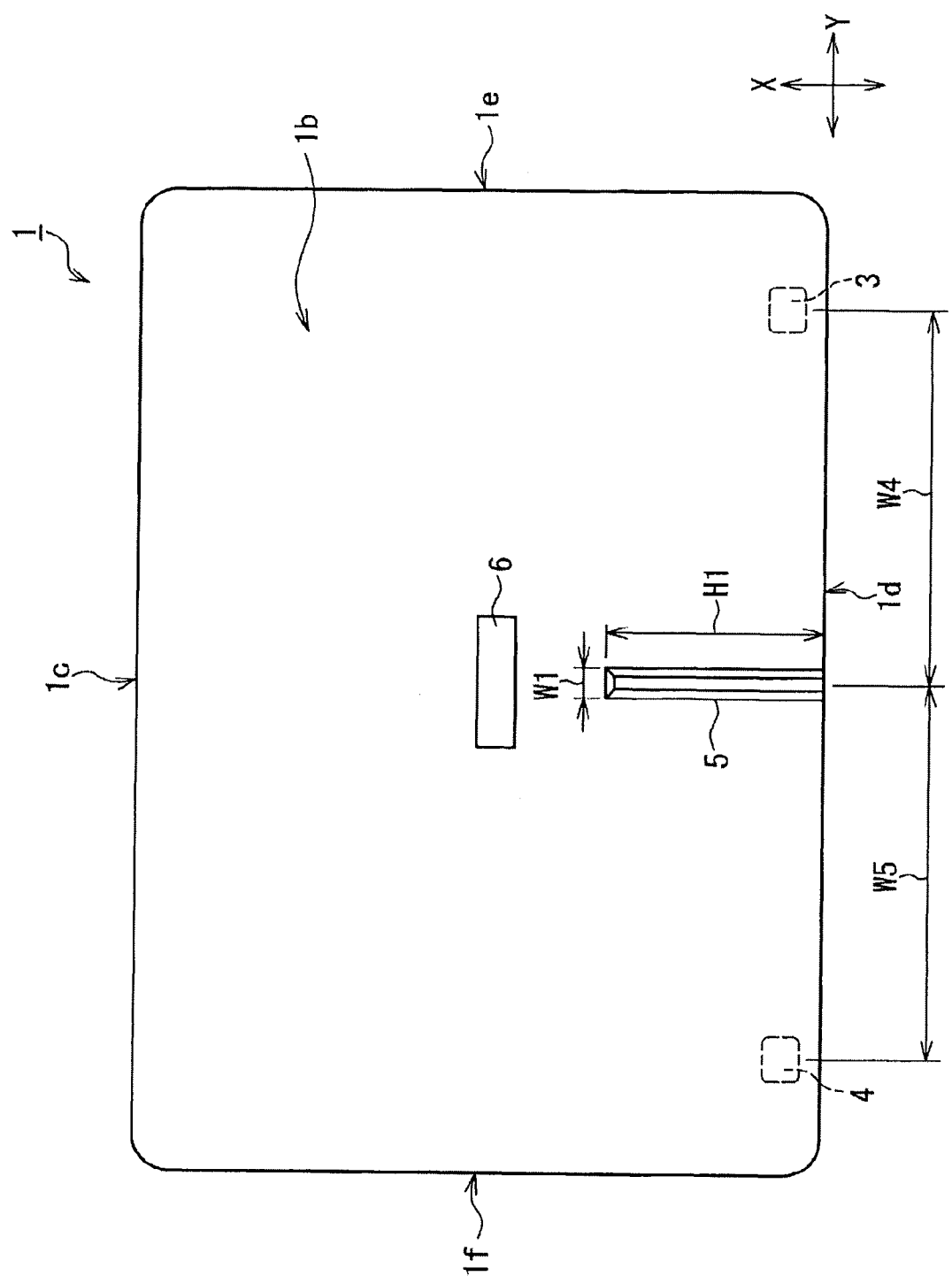
FIG. 1B is a rear view of the main device according to the embodiment.
Figure 1C:
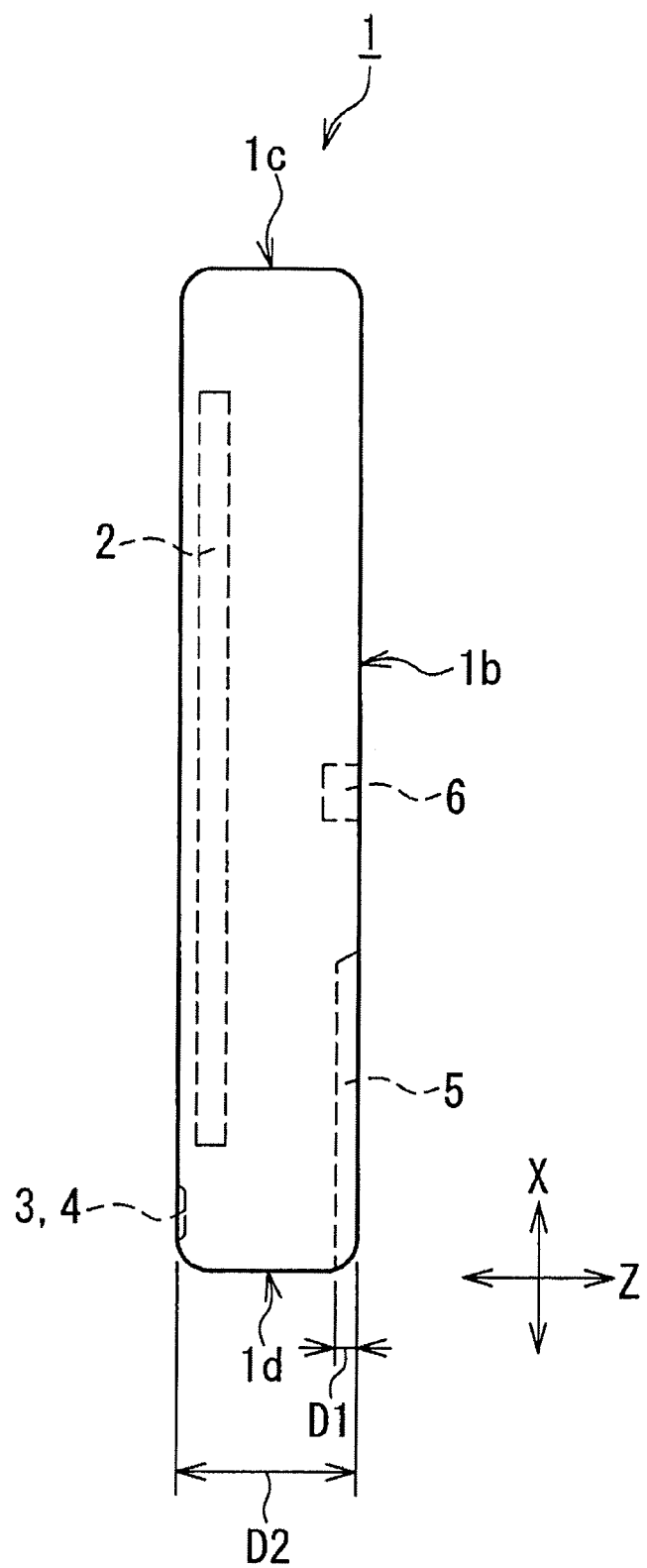
FIG. 1C is a side view of the main device according to the embodiment.

FIG. 1A is a front view of the computer device according to the present embodiment. FIG. 1B is a rear view of the computer device according to the present embodiment. FIG. 1C is a side view of the computer device according to the present embodiment.

The computer device 1 is an example of the main device. As the main device according to the present embodiment, the portable computer device 1 including a single housing is exemplified as an example. However, the main device may be a device other than the computer device as long as it is a main device that can at least be mounted on and dismounted from the extension device, and is not limited to a device including only a single housing. Examples of the device other than the computer device include a PDA (Personal Digital Assistant), a portable game device, a mobile phone, and a portable music player. In addition, examples of the device other than the deice including a single housing include a device that includes two housings supported by a hinge mechanism, such as a laptop personal computer.

In the computer device 1, electronic components such as a central processing unit (CPU) and a storage element are disposed within the housing. In the computer device 1, the outer edge thereof is covered with a substantially parallelepiped-shaped housing having a front surface 1a, a back surface 1b, a top surface 1c, a bottom surface 1d, a side surface 1e, and a side surface 1f. It should be noted that the side surfaces 1e and 1f of the computer device 1 are specified, for example, on the basis of a direction in which a user views the computer device 1 while operating the computer device 1, and if necessary to specify them, the side surface 1e is referred to as a left side surface and the side surface 1f is referred to as a right side surface. In addition, the shape of the computer device 1 is not limited to the parallelepiped shape and may be another shape as long as the computer device 1 can be mounted on the extension device of the present embodiment.

As shown in FIGS. 1A and 1C, the computer device 1 includes a display panel 2 in the front surface 1a. The display panel 2 is capable of displaying various video images, and can be configured, for example, as a liquid crystal display panel. The display panel 2 may include a touch panel that can detect touch with a finger, a stylus pen, or the like.

The computer device 1 includes a first positioning recess 3 and a second positioning recess 4 in the front surface 1a. The first positioning recess 3 is formed in the front surface 1a and near the bottom surface 1d and the left side surface 1e. The second positioning recess 4 is formed in the front surface 1a and near the bottom surface 1d and the right side surface 1f. In the present embodiment, the openings of the first positioning recess 3 and the second positioning recess 4 have rectangular shapes as shown in FIG. 1A, but may have other shapes.

As shown in FIGS. 1B and 1C, the computer device 1 includes a guide recess 5 and a connector 6 in the back surface 1b. The guide recess 5 is formed in the back surface 1b, near the bottom surface 1d, and at the center of the back surface 1b in a longitudinal direction. The guide recess 5 is formed in the back surface 1b so as to be long and extend along a direction from the top surface 1c toward the bottom surface 1d. The connector 6 is electrically connectable to a connector 19 (described later) provided in an extension device 10. The connector 6 is used when information communication or the like is performed between the computer device 1 and the extension device 10.

2. Configuration of Extension Device

Figure 2A:
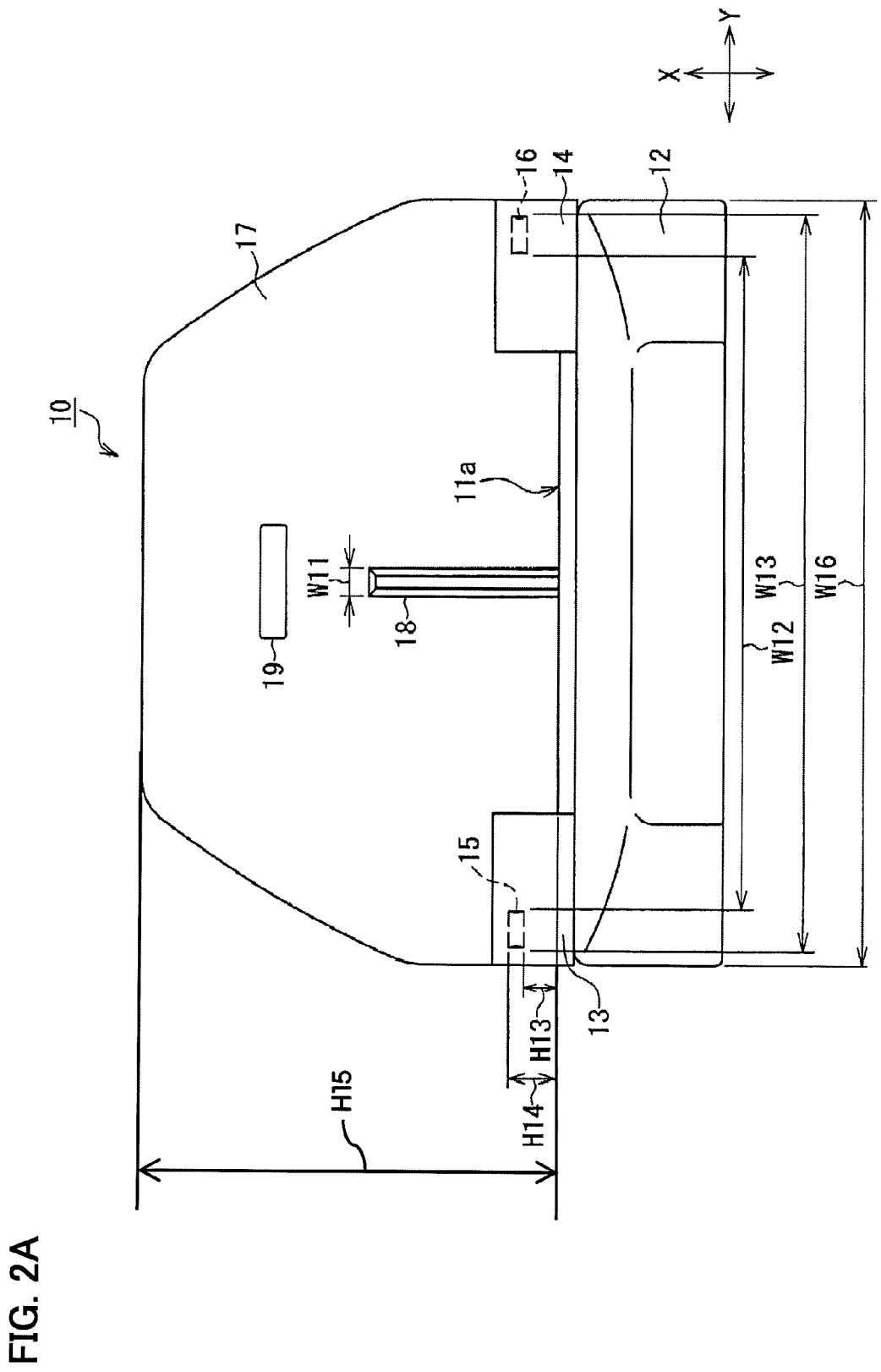
FIG. 2A is a front view of an extension device according to the embodiment.
Figure 2B:
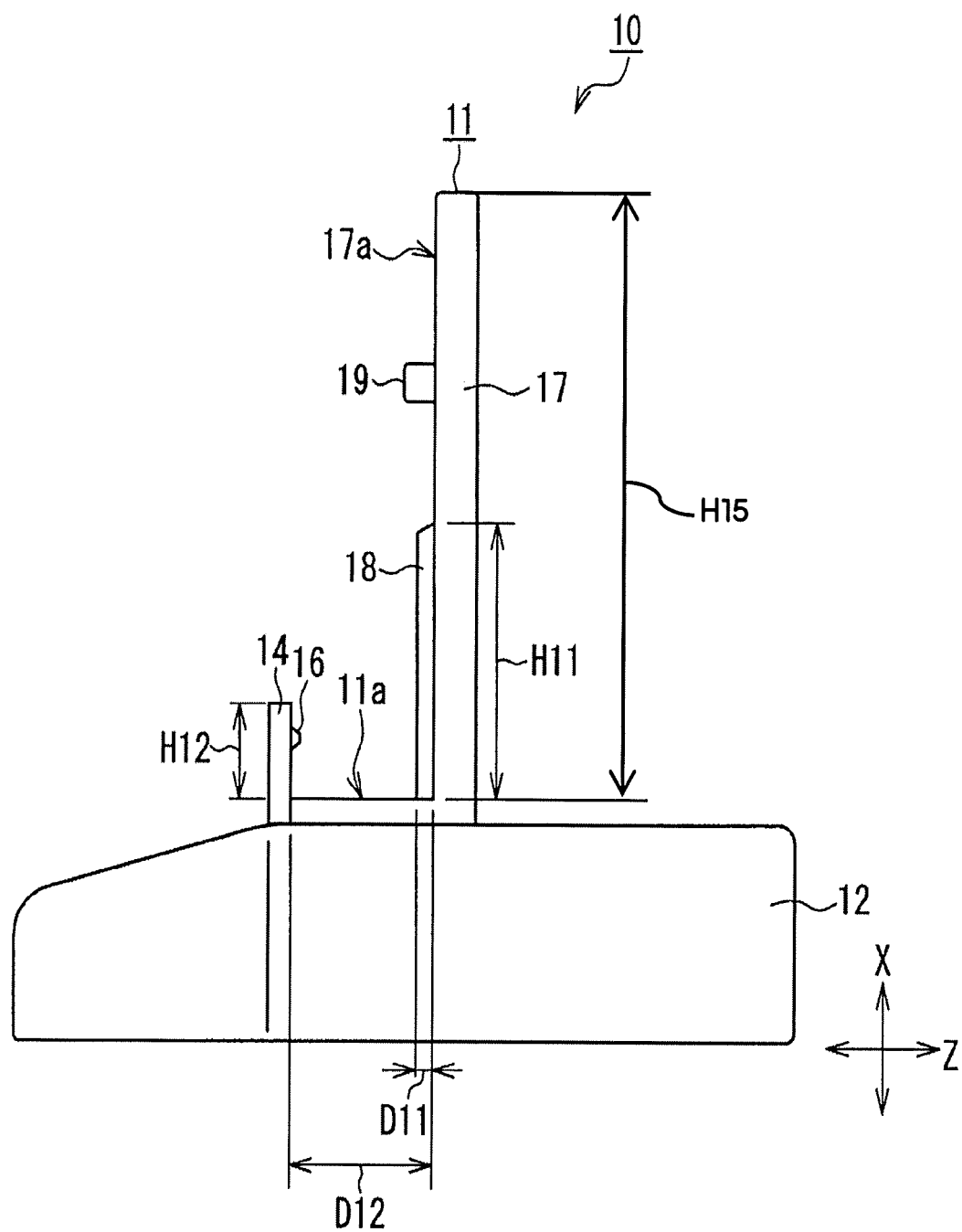
FIG. 2B is a side view of the extension device according to the embodiment.
Figure 2C:
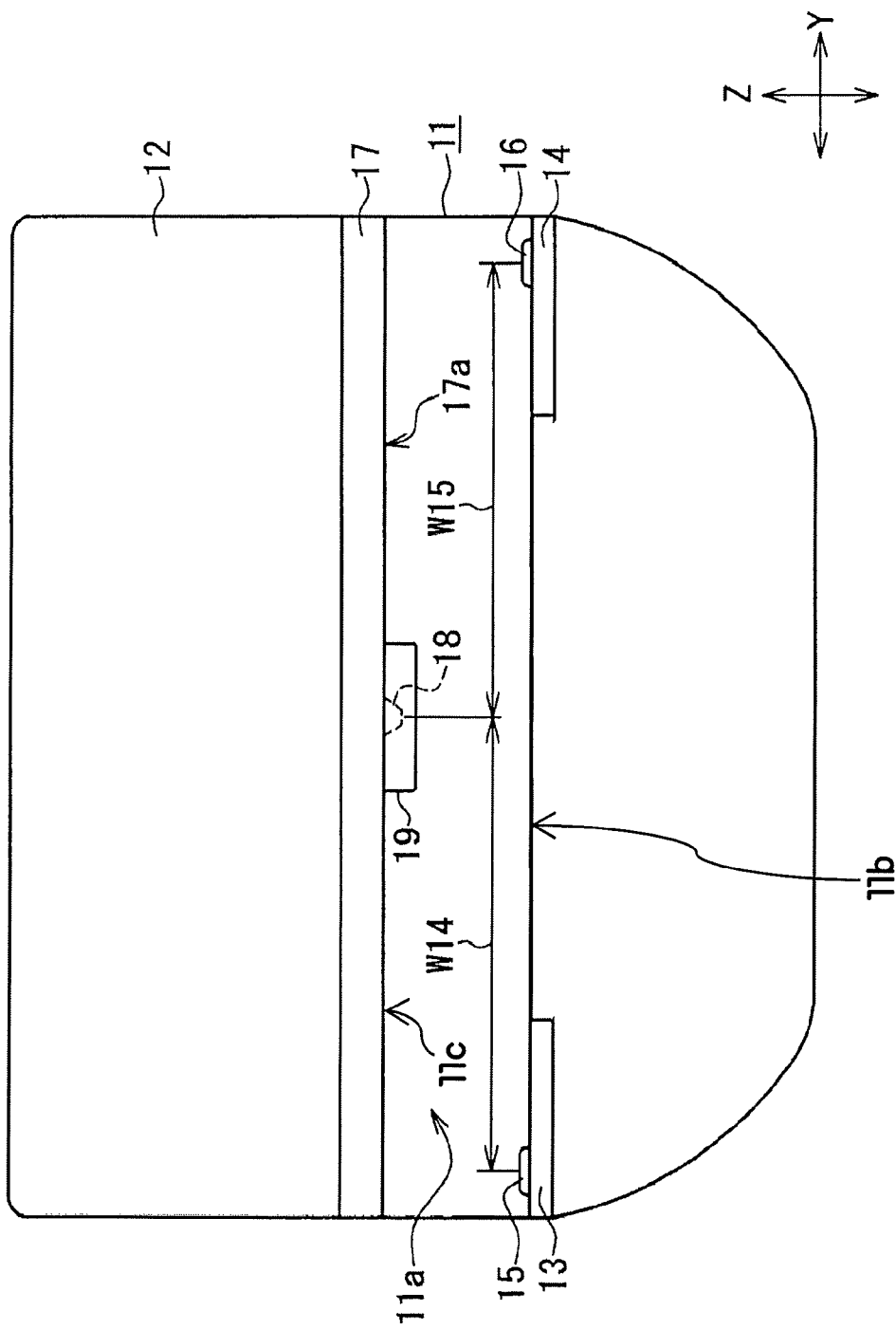
FIG. 2C is a plan view of the extension device according to the embodiment.

FIG. 2A is a front view of the extension device according to the present embodiment. FIG. 2B is a side view of the extension device according to the present embodiment. FIG. 2C is a plan view of the extension device according to the present embodiment, as seen from above.

For example, the computer device 1 shown in FIGS. 1A to 1C can be mounted on the extension device 10. When the computer device 1 is mounted on the extension device 10, the extension device 10 can perform information communication between the mounted computer device 1 and another device and can supply power to the computer device 1. The extension device 10 includes various interfaces through which information communication is possible with an external device, and a power supply terminal connectable to a commercial power supply. The extension device 10 includes a body retaining portion 11, a base 12, a first wall portion 13, a second wall portion 14, a first positioning projection 15, a second positioning projection 16, a back surface wall portion 17, a guide projection 18, and the connector 19.

The body retaining portion 11 is a member that can retain the computer device 1. The body retaining portion 11 in the present embodiment is a member independent of the base 12 and fixed to the base 12 by means of screws or the like. It should be noted that the body retaining portion 11 may be formed so as to be integrated with the base 12. In addition, the body retaining portion 11 is formed so as to be integrated with the back surface wall portion 17 as shown in FIG. 2B. However, this is an example, the body retaining portion 11 can include only a placement surface 11a (described later), and the back surface wall portion 17 can be formed as a separate member. In the present embodiment, the body retaining portion 11 has a configuration in which a metallic frame is included in order to increase rigidity and a resin housing is joined to the outside of the frame in order to prevent scars or the like from being made on the computer device 1. It should be noted that the entirety of the body retaining portion 11 may be formed from resin or metal, and the material thereof is not limited. The body retaining portion 11 includes the placement surface 11a with which the bottom surface 1d of the computer device 1 is in contact when the computer device 1 is mounted thereon. In view of stabilization of the attitude of the computer device 1, the placement surface 11a preferably has a surface shape having a surface corresponding to the outer shape of the bottom surface 1d (see FIG. 2C etc.), and is a flat surface in the present embodiment. As shown in FIG. 2C, the placement surface 11a is formed such that a planar shape thereof is rectangular. The placement surface 11a has a pair of long sides one of which is a long side 11b which the first wall portion 13 and the second wall portion 14 are provided in a standing manner adjacently to (namely, a line of intersection of the first wall portion 13 and the second wall portion 14 and the placement surface 11a is the long side 11b). The back surface wall portion 17 is provided in a standing manner adjacently to a long side 11c that is the other long side of the pair of long sides of the placement surface 11a (namely, a line of intersection of the back surface wall portion 17 and the placement surface 11a is the other long side 11c). No components corresponding to wall portions are formed adjacently to a pair of short sides of the placement surface 11a. In other words, in the body retaining portion 11, both edges of the placement surface 11a in the longitudinal direction are opened, and the placement surface 11a is sandwiched between the first wall portion 13 and the second wall portion 14 and the back surface wall portion 17 which face each other.

The base 12 retains the body retaining portion 11. The base 12 has a large contact area in order to stabilize the attitude of the extension device 10 in a state where the computer device 1 is mounted on the body retaining portion 11. The base 12 preferably has a high weight in order to stabilize the attitude of the extension device 10 in a state where the computer device 1 is mounted on the body retaining portion 11. In order to enable communication with an external device, the base 12 includes a terminal to which various interface cables are connectable, an optical disc drive, and the like, but illustration thereof is omitted.

As shown in FIG. 2C, the first wall portion 13 and the second wall portion 14 are provided in a standing manner at positions along the long side 11b of the placement surface 11a and in a direction substantially orthogonal to the placement surface 11a. As shown in FIG. 2B, the first wall portion 13 and the second wall portion 14 face the back surface wall portion 17 across a void of a dimension D12. It should be noted that the first wall portion 13 and the second wall portion 14 are formed so as to be spaced apart from each other as shown in FIG. 2A, but may be continuously and integrally formed along the long side 11b of the placement surface 11a.

As shown in FIGS. 2B and 2C, the first positioning projection 15 is formed on a surface of the first wall portion 13 which faces the back surface wall portion 17 (namely, on an end surface of the body retaining portion 11 which is determined by the base 12 and the long side 11b). The first positioning projection 15 is formed at a position where the first positioning projection 15 is engageable with the first positioning recess 3 (see FIG. 1A) of the computer device 1. The second positioning projection 16 is formed on a surface of the second wall portion 14 which faces the back surface wall portion 17 (namely, on an end surface of the body retaining portion 11 which is determined by the base 12 and the long side 11b). The second positioning projection 16 is formed at a position where the second positioning projection 16 is engageable with the second positioning recess 4 (see FIG. 1A) of the computer device 1. When the computer device 1 is placed at a predetermined position in the body retaining portion 11, the first positioning projection 15 engages the first positioning recess 3, and the second positioning projection 16 engages the second positioning recess 4.

As shown in FIGS. 2B and 2C, the back surface wall portion 17 is provided in a standing manner at a position along the other long side 11c of the placement surface 11a and in the direction substantially orthogonal to the placement surface 11a. As shown in FIG. 2B, the back surface wall portion 17 faces the first wall portion 13 and the second wall portion 14 across the void of the dimension D12. The back surface wall portion 17 is formed so as to have a height dimension at least equal to or greater than the height dimension H11 of the guide projection 18. When the height of the back surface wall portion 17 is decreased, the height of the body retaining portion 11 can be decreased, and thus the height of the extension device 10 can be decreased. On the other hand, when the height of the back surface wall portion 17 is increased, the back surface 1b of the computer device 1 mounted on the body retaining portion 11 can assuredly be supported, and thus the attitude of the computer device 1 can be stabilized. It should be noted that in the body retaining portion 11 of the present embodiment, the back surface wall portion 17 is formed so as to be integrated with the placement surface 11a as shown in FIG. 2B, but the back surface wall portion 17 and the placement surface 11a can be formed as separate members. In addition, in a configuration in which the placement surface 11a and the back surface wall portion 17 are formed as separate members, the placement surface 11a can also be formed as a surface of the base 12.

The guide projection 18 is formed on a wall surface 17a of the back surface wall portion 17 so as to project therefrom. The guide projection 18 is formed in a rectangular-columnar shape. The guide projection 18 is formed such that a planar shape thereof is a rectangular shape in which long sides are much longer than short sides, as shown in FIG. 2A. One of the short sides is located at the boundary between the placement surface 11a and the wall surface 17a. The guide projection 18 is formed so as to have a height dimension H11 (see FIG. 2B) equal to or less than the height dimension H1 (see FIG. 1B) of the guide recess 5 of the computer device 1. It should be noted that the guide projection 18 is formed so as to have a width dimension W11 (see FIG. 2A) equal to or less than the width dimension W1 (see FIG. 1B) of the guide recess 5 of the computer device 1 in order that the guide projection 18 does not shift in a Y direction when the computer device 1 is mounted.

The connector 19 is disposed on the wall surface 17a of the back surface wall portion 17. When the computer device 1 is mounted at a predetermined position in the body retaining portion 11, the connector 19 is electrically connected to the connector 6 (see FIG. 1B) provided in the computer device 1.

The dimensional relation between each component of the computer device 1 and each component of the extension device 10 is as follows.

| | |
|---|---|
| $H1 \geq H11$ | relational expression (1) |
| $W1 \geq W11$ | relational expression (2) |
| $W3 \leq W12$ | relational expression (3) |
| $W13 \leq W2$ | relational expression (4) |
| $H2 \leq H13$ | relational expression (5) |
| $H14 \leq H3$ | relational expression (6) |
| $D2 < D12$ | relational expression (7) |
| $W4 = W14$ | relational expression (8) |
| $W5 = W15$ | relational expression (9) |

The dimension H1 is the height dimension of the guide recess 5 from the placement surface 11a (see FIG. 1B).

The dimension H2 is the height dimension from the bottom surface 1d of the computer device 1 to the lower edges (edges closest to the bottom surface 1d of the computer device 1) of the first positioning recess 3 and the second positioning recess 4 (see FIG. 1A).

The dimension H3 is the height dimension from the bottom surface 1d of the computer device 1 to the upper edges (edges closest to the top surface 1c of the computer device 1) of the first positioning recess 3 and the second positioning recess 4 (see FIG. 1A).

The dimension W1 is the standing-provision width dimension of the guide recess 5 in the back surface 1b of the computer device 1 (see FIG. 1B).

The dimension W2 is the width dimension of the longest gap (outside-dimension gap) between the first positioning recess 3 and the second positioning recess 4 (see FIG. 1A).

The dimension W3 is the width dimension of the shortest gap (inside-dimension gap) between the first positioning recess 3 and the second positioning recess 4 (see FIG. 1A).

The dimension W4 is the distance from a center line of the first positioning recess 3 to a center line of the guide recess 5 (see FIG. 1B).

The dimension W5 is the distance from a center line of the second positioning recess 4 to the center line of the guide recess 5 (see FIG. 1B).

The dimension D2 is the thickness dimension of the computer device 1 (see FIG. 1C).

The dimension H11 is the height dimension of the guide projection 18 (see FIG. 2B).

The dimension H13 is the height dimension from the placement surface 11a to the lower edges (edges closest to the placement surface 11a) of the first positioning projection 15 and the second positioning projection 16 (see FIG. 2A).

The dimension H14 is the height dimension from the placement surface 11a to the upper edges (edges farthest from the placement surface 11a) of the first positioning projection 15 and the second positioning projection 16 (see FIG. 2A).

The dimension W11 is the standing-provision width dimension of the guide projection 18 in the placement surface 11a (see FIG. 2A).

The dimension W12 is the width dimension of the shortest gap (inside-dimension gap) between the first positioning projection 15 and the second positioning projection 16 (see FIG. 2A).

The dimension W13 is the width dimension of the longest gap (outside-dimension gap) between the first positioning projection 15 and the second positioning projection 16 (see FIG. 2A).

The dimension W 14 is the distance from a center line of the first positioning projection 15 to a center line of the guide projection 18 (see FIG. 2C).

The dimension W15 is the distance from a center line of the second positioning projection 16 to the center line of the guide projection 18 (see FIG. 2C).

The dimension D12 is the facing gap dimension between the first positioning projection 15 and the second positioning projection 16 and the back surface wall portion 17.

It should be noted that the "longest gap dimension" is the gap dimension between the portions of two members which are farthest from each other. The "shortest gap dimension" is the gap dimension between the portions of two members which are closest to each other. In addition, the "center line" is the center in the width direction connecting the left side surface 1e and the right side surface if in the computer device 1, and is the center in the direction of the line of intersection of the back surface wall portion 17 and the placement surface 11a in the extension device 10.

3. Mounting/Dismounting Operations between Extension Device and Computer Device When the computer device 1 is mounted on the extension device 10, the computer device 1 is initially mounted on the body retaining portion 11 in such an attitude that the bottom surface 1d faces the placement surface 11a and the back surface 1b faces the wall surface 17a of the back surface wall portion 17, as shown in FIG. 3.

Figure 3:
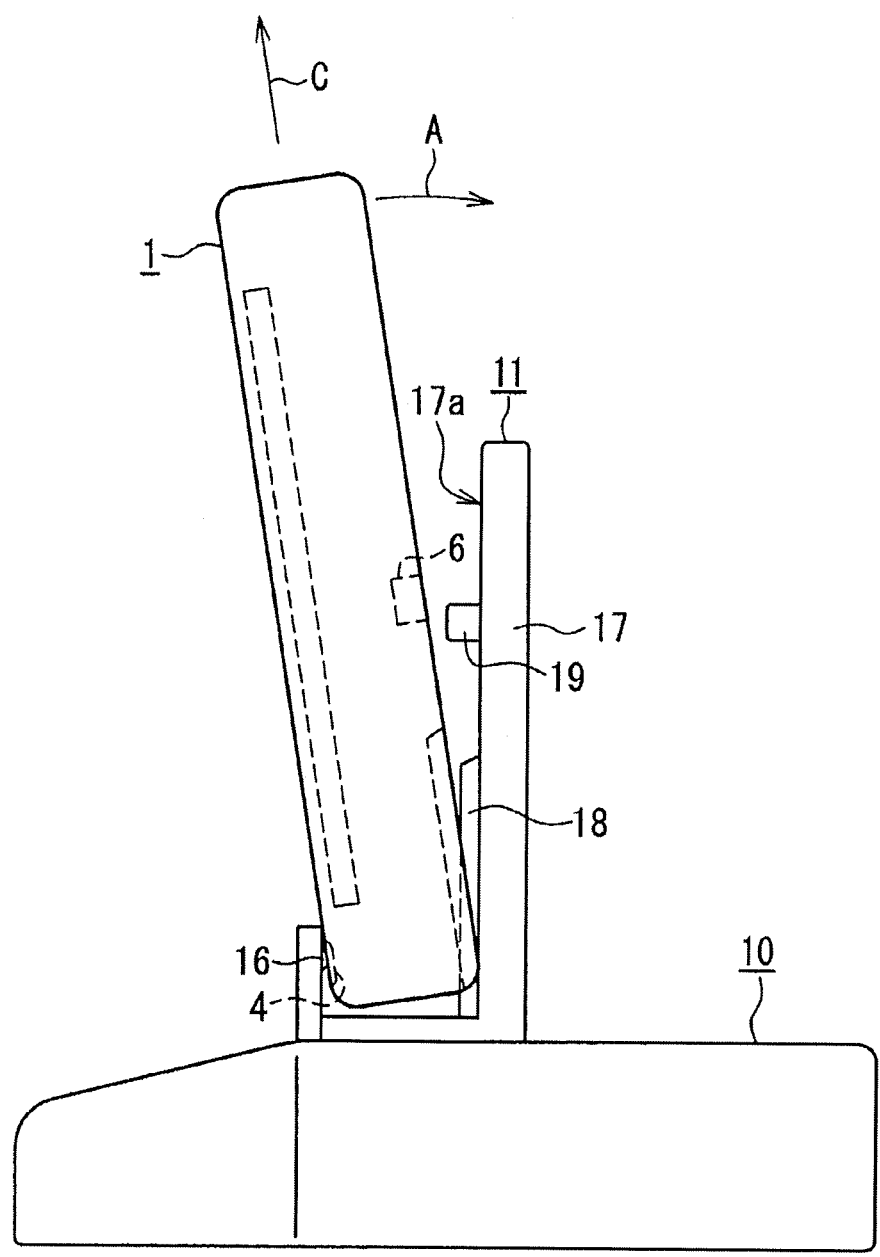
FIG. 3 is a side view showing a state when mounting the main device on the extension device.

Specifically, first, as shown in FIG. 3, the computer device 1 is inserted between the first wall portion 13 and the second wall portion 14 and the back surface wall portion 17 such that at least a portion of the computer device 1 is in a tilted attitude. Since the relation between the thickness D2 of the computer device 1 and the gap dimension D12 between the first wall portion 13 and the second wall portion 14 and the back surface wall portion 17 is the dimensional relation shown in the above relational expression (7), when at least the portion of the computer device 1 is tilted (tilted in the direction to the first wall portion 13 and the second wall portion 14 in FIG. 3), the computer device 1 can be inserted between the first wall portion 13 and the second wall portion 14 and the back surface wall portion 17. In other words, the height dimension H12 (see FIG. 2B) of the first wall portion 13 and the second wall portion 14 from the placement surface 11 is set so as to be less than the maximum height dimension H15 (see FIGS. 2A and 2B) of the back surface wall portion 17 from the placement surface 11. Due to such a configuration, in a state where the first wall portion 13 and the second wall portion 14 are located on the lower side and the third guide projection 18 is tilted on the upper side, an operation of mounting the computer device 1 to the extension device 10 can be started. Thus, the user can start the mounting operation while confirming that the guide projection 18 provided in the extension device 10 slides and engages the guide recess 5 provided in the computer device 1.

Next, the first positioning projection 15 of the extension device 10 is caused to engage the first positioning recess 3 of the computer device 1, and the second positioning projection 16 of the extension device 10 is caused to engage the second positioning recess 4 of the computer device 1. At that time, the first positioning recess 3 and the first positioning projection 15 and the second positioning recess 4 and the second positioning projection 16 can be caused to engage each other, since they have the dimensional relations shown in the above relational expressions (3), (4), (5), and (6). In other words, the guide recess 5 in the computer device 1 is located so as to intersect the boundary between the bottom surface 1d and the back surface 1b. The height dimension H14 (see FIGS. 2A and 2B) of the first positioning projection 15 and the second positioning projection 16 in the extension device 10 from the placement surface 11 is set so as to be less than the height dimension H11 (see FIGS. 2A and 2B) of the third guide projection 18 from the placement surface 11. Due to such a configuration, the user can reduce occurrence of lateral shift of the guide projection 18 of the extension device 10 and the guide recess 5 of the computer device 1 in a state where the computer device 1 is tilted relative to the extension device 10. Thus, the user can stably mount the computer device 1 on the extension device 10 due to assured guiding and engagement of the first positioning projection 15 and the first positioning recess 3 and assured guiding and engagement of the second positioning projection 16 and the second positioning recess 4.

At that time, since the first positioning projection 15, the second positioning projection 16, the first positioning recess 3, and the second positioning recess 4 have the positional relations shown in the above relational expressions (3) to (6), engagement between the first positioning projection 15 and the first positioning recess 3 and engagement between the second positioning projection 16 and the second positioning recess 4 can be performed at the same time.

By causing the first positioning projection 15 to engage the first positioning recess 3 and causing the second positioning projection 16 to engage the second positioning recess 4, the computer device 1 is positioned in the Y-axis direction (see FIG. 1A). In addition, the guide projection 18 engages the guide recess 5 on the basis of the above relational expressions (1), (2), (8), and (9).

It should be noted that the relation between the depth dimension D1 of the guide recess 5 of the computer device 1 and the height dimension D11 of the guide projection 18 of the extension device 10 may be any relation as long as the above relational expressions (1), (2), and (7) are met. However, D1 and D11 are preferably equal to each other for decreasing the thickness of the computer device 1 and reducing the size of the extension device 10.

Next, the computer device 1 is displaced in a direction indicated by an arrow A while the engagement state between the first positioning projection 15 and the first positioning recess 3 and the engagement state between the second positioning projection 16 and the second positioning recess 4 are kept. At that time, the computer device 1 rotates in the direction indicated by the arrow A about the engagement portion between the first positioning projection 15 and the first positioning recess 3 and the engagement portion between the second positioning projection 16 and the second positioning recess 4. In addition, when the computer device 1 is displaced in the direction indicated by the arrow A, the guide recess 5 is guided along the guide projection 18. Thus, the computer device 1 is displaced in the direction indicated by the arrow A while the position thereof in the Y-axis direction is restricted. It should be noted that when the computer device 1 is rotationally displaced in the arrow A direction, if the first wall portion 13 and the front surface 1a and the second wall portion 14 and the front surface 1a are in contact with each other, the computer device 1 is displaced about the contact portions. In other words, when the computer device 1 is mounted on the extension device 10, the first positioning projection 15 and the second positioning projection 16 suppress their shift from the first positioning recess 3 and the second positioning recess 4 in the lateral direction.

By displacing the computer device 1 in the direction indicated by the arrow A until the bottom surface 1d of the computer device 1 comes into surface contact with the placement surface 11a of the body retaining portion 11, the computer device 1 is positioned with respect to the body retaining portion 11. At that time, the first positioning projection 15, the second positioning projection 16, the first positioning recess 3, and the second positioning recess 4 keep the engagement states therebetween, since they have the positional relations shown in the above relational expressions (5) and (6).

Figure 4A:
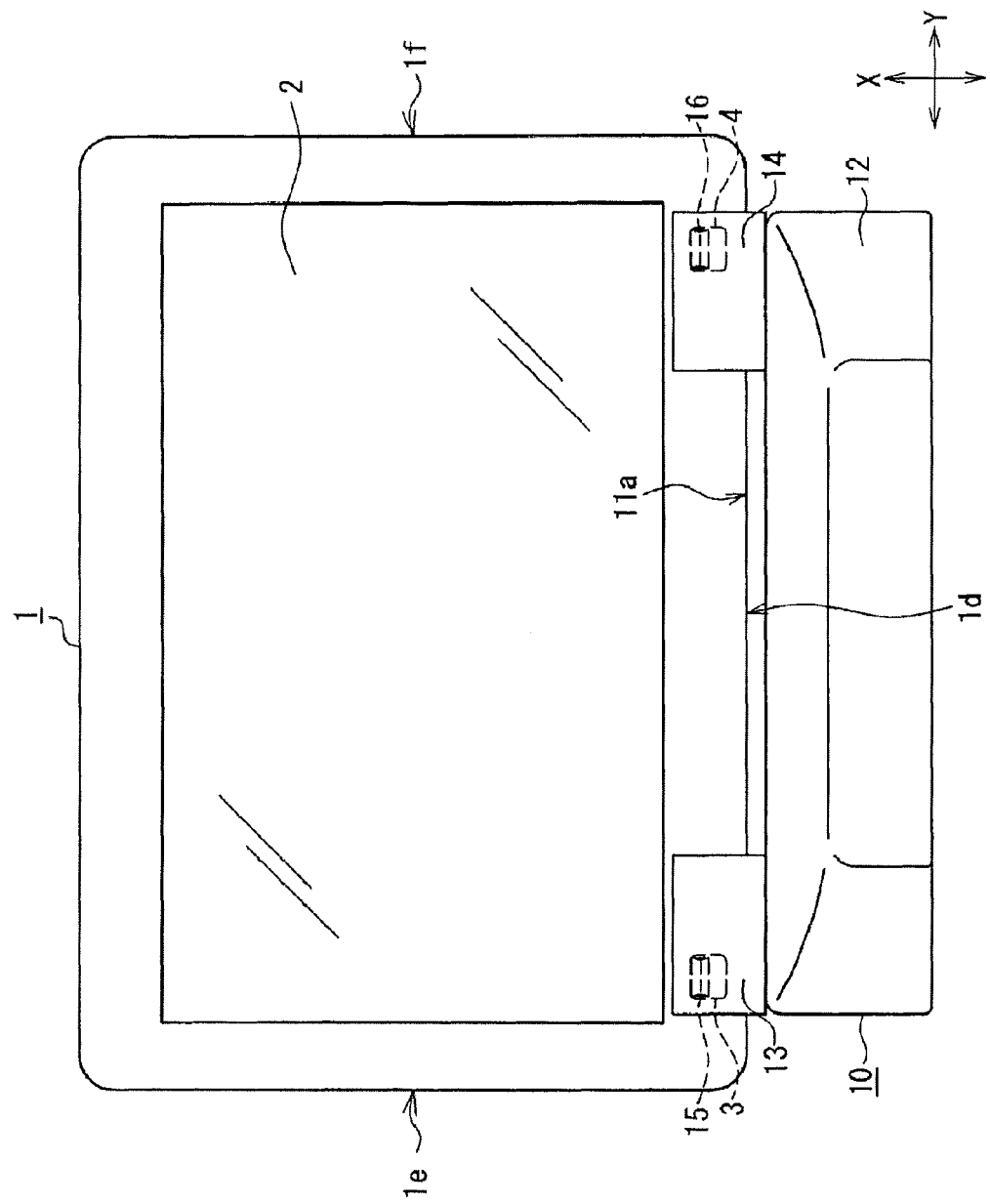
FIG. 4A is a front view showing a state where the main device is mounted on the extension device.
Figure 4B:
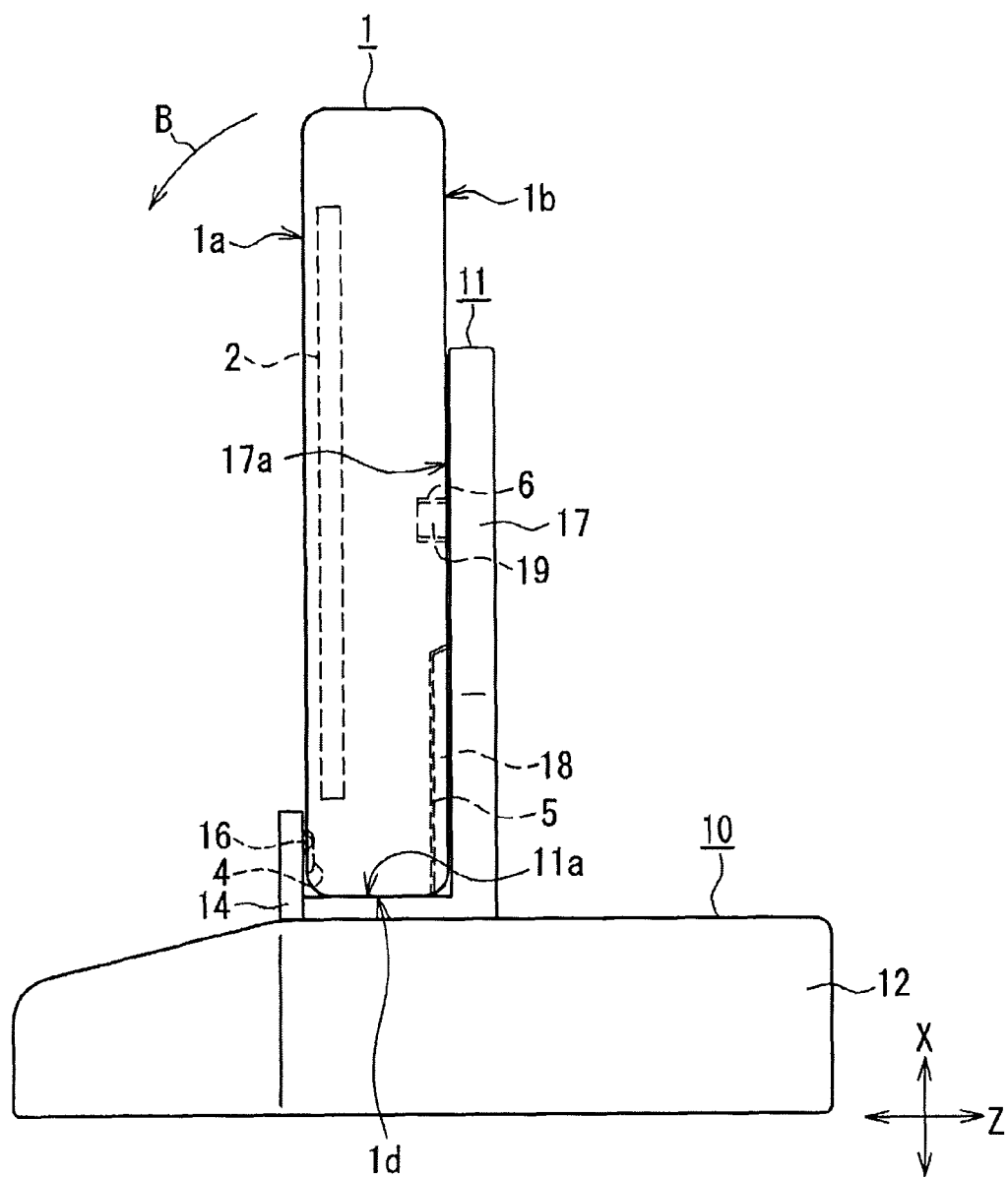
FIG. 4B is a side view showing the state where the main device is mounted on the extension device.
Figure 4C:
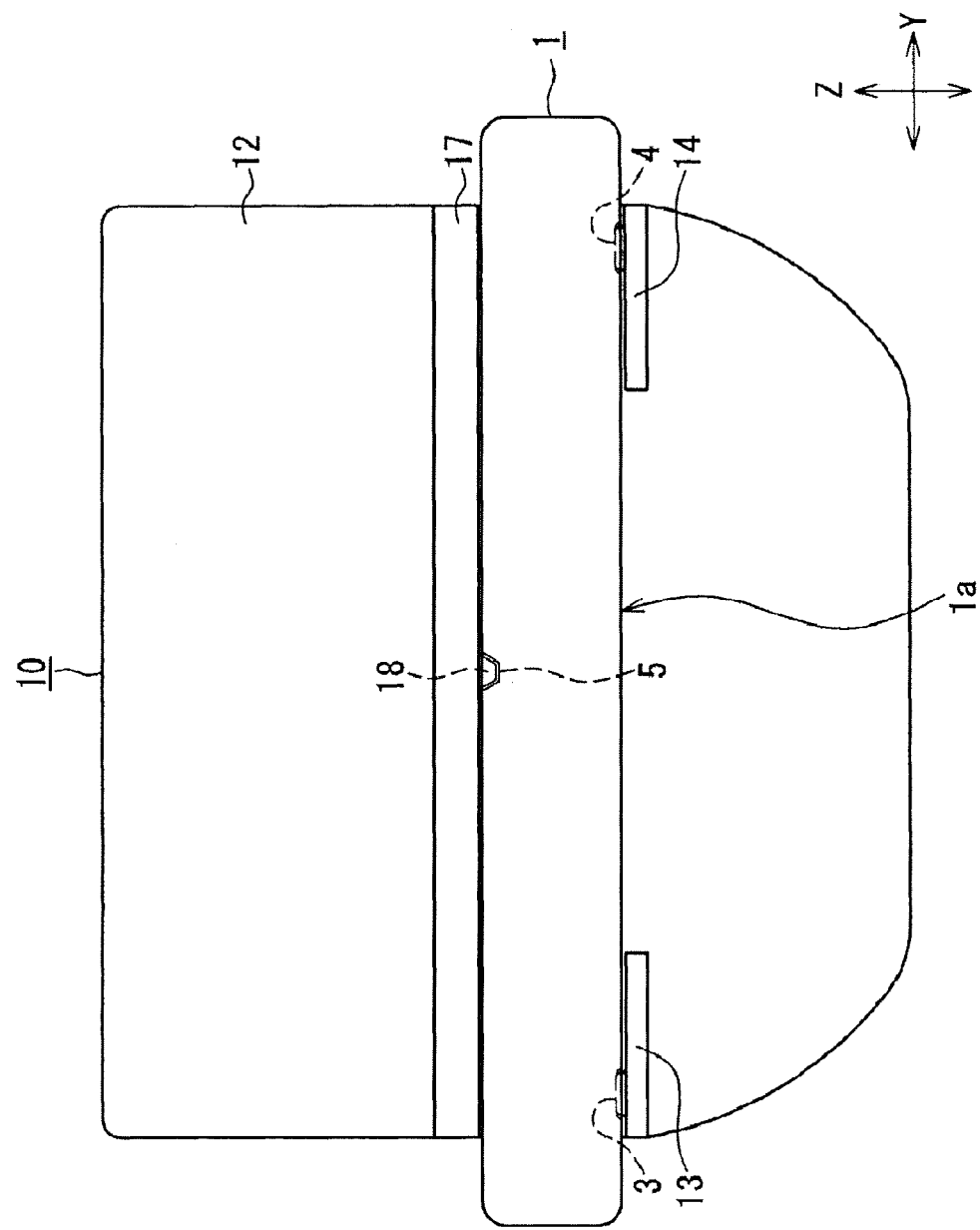
FIG. 4C is a plan view showing the state where the main device is mounted on the extension device.

FIG. 4A is a front view of the extension device 10 on which the computer device 1 is mounted. FIG. 4B is a side view of the extension device 10 on which the computer device 1 is mounted. FIG. 4C is a plan view of the extension device 10 on which the computer device 1 is mounted, as seen from above. As shown in FIGS. 4A to 4C, when the computer device 1 is mounted on the extension device 10, the connector 6 is electrically connected to the connector 19 provided in the extension device 10, and thus the computer device 1 is electrically connected to the extension device 10.

In addition, the distance from the bottom surface 1d to the display panel 2 in the computer device 1 is set so as to be larger than the distances from the placement surface 11a to the first wall portion 13 and the second wall portion 14 in the extension device 10. Thus, when the computer device 1 is mounted on the extension device 10, the display panel 2 is not covered with the extension device 10, and the entirety of the display surface of the display panel 2 is exposed. Therefore, the user can view a video image displayed on the display panel 2, and when a touch panel is provided in the display panel 2, the user can perform an operation of touching the touch panel.

As shown in FIGS. 4A to 4C, in a state where the computer device 1 is mounted on the extension device 10, the front surface 1a side of the computer device 1 is positioned by the first positioning projection 15 and the second positioning projection 16, and the back surface 1b side of the computer device 1 is positioned by the guide projection 18, whereby the position of the computer device 1 in the Y-axis direction is restricted. In addition, in a state where the computer device 1 is mounted on the extension device 10, the computer device 1 is disposed in the gap between the first wall portion 13 and the second wall portion 14 and the back surface wall portion 17, whereby the position of the computer device 1 in a Z-axis direction is restricted. Further, in a state where the computer device 1 is mounted on the extension device 10, the bottom surface 1d is in contact with the placement surface 11a of the body retaining portion 11, whereby the position of the computer device 1 in the downward direction of an X-axis direction is restricted. Since these relations are met, the connector 6 of the computer device 1 and the connector 19 of the extension device 10 can be connected to each other.

It should be noted that in the mounted state shown in FIGS. 4A to 4C, the front surface 1a of the computer device 1 and the first wall portion 13 and the second wall portion 14 may be in contact with each other or may be spaced apart from each other across a slight gap. In addition, the back surface 1b of the computer device 1 and the back surface wall portion 17 may be in contact with each other or may be spaced apart from each other across a slight gap.

In addition, since both edges of the placement surface 11a in the longitudinal direction are opened, even when the width dimension W6 (see FIG. 1A) of the computer device 1 is larger than the width dimension W16 (see FIG. 2A) of the placement surface 11a in the longitudinal direction, the computer device 1 can be retained by the body retaining portion 11. In other words, as shown in FIGS. 4A and 4C, the body retaining portion 11 can retain the computer device 1 in a state where the side surface 1e side and the side surface 1f side of the computer device 1 protrude from the body retaining portion 11. Thus, when the relational expressions (1) to (9) are met, the body retaining portion 11 can retain the computer device 1 regardless of the width dimension W6 of the computer device 1.

When the computer device 1 is dismounted from the extension device 10, the computer device 1 is displaced in a direction indicated by an arrow B. At that time, the first wall portion 13 and the second wall portion 14 are formed so as to have a height H12 (see FIG. 2B) much shorter than the length of the back surface wall portion 17, the first positioning projection 15 is engaged with the first positioning recess 3, and the second positioning projection 16 is engaged with the second positioning recess 4. Thus, the computer device 1 can be rotated in the direction indicated by the arrow B about the contact portion between the first positioning projection 15 or the surface of the first wall portion 13 and the first positioning recess 3 and the contact portion between the second positioning projection 16 or the surface of the second wall portion 14 and the second positioning recess 4.

When the computer device 1 is displaced to a position where the bottom surface 1d is separated from the placement surface 11a of the body retaining portion 11, it becomes a state shown in FIG. 3. By displacing the computer device 1 from the state shown in FIG. 3 in a direction indicated by an arrow C, the first positioning projection 15 is disengaged from the first positioning recess 3, the second positioning projection 16 is disengaged from the second positioning recess 4, and the guide projection 18 is disengaged from the guide recess 5. Thus, the computer device 1 is dismounted from the body retaining portion 11.

4. Advantageous Effects of Embodiment and Others

According to the present embodiment, since the computer device 1 includes the first positioning recess 3, the second positioning recess 4, and the guide recess 5 and the extension device 10 includes the first positioning projection 15, the second positioning projection 16, and the guide projection 18, the extension device 10 can retain the computer device 1. Due to such a configuration, the computer device 1 can be prevented from being improperly mounted on the extension device 10. In other words, when attempting to mount the computer device 1 to the extension device 10 in an attitude in which the front and back of the computer device 1 are accidentally inverted (in an attitude in which the front surface 1a of the computer device 1 faces the back surface wall portion 17 of the extension device 10 and the back surface 1b of the computer device 1 faces the first wall portion 13 and the second wall portion 14 of the extension device 10), each recess provided in the main device and each projection provided in the extension device 10 cannot engage each other, and thus the computer device 1 cannot be mounted onto the extension device 10. In the present embodiment, the computer device 1 can be mounted to the extension device 10 only in an attitude in which the front surface 1a of the computer device 1 faces the first wall portion 13 and the second wall portion 14 of the extension device 10 and the back surface 1b of the computer device 1 faces the back surface wall portion 17 of the extension device 10.

According to the present embodiment, the height dimension H12 of the first wall portion 13 and the second wall portion 14 from the placement surface 11 is set so as to be less than the height dimension H15 of the back surface wall portion 17 from the placement surface 11. Due to such a configuration, in a state where the first wall portion 13 and the second wall portion 14 are located on the lower side and the third guide projection 18 is tilted on the upper side, the operation of mounting the computer device 1 to the extension device 10 can be started. Thus, the user can start the mounting operation while confirming that the guide projection 18 provided in the extension device 10 slides and engages the guide recess 5 provided in the computer device 1. In addition, according to the present embodiment, the guide recess 5 in the computer device 1 is located so as to intersect the boundary between the bottom surface 1d and the back surface 1b, and the height dimension H14 of the first positioning projection 15 and the second positioning projection 16 in the extension device 10 from the placement surface 11 is set so as to be less than the height dimension H11 of the third guide projection 18 from the placement surface 11. Due to such a configuration, occurrence of lateral shift of the guide projection 18 of the extension device 10 and the guide recess 5 of the computer device 1 can be reduced, and the computer device 1 can assuredly be mounted on the extension device 10.

According to the present embodiment, since the extension device 10 and the computer device 1 are configured to be retained to each other by causing at least positioning projections and positioning recesses at three locations to engage each other, both edges of the placement surface 11a of the body retaining portion 11 in the longitudinal direction can be opened. Thus, the extension device 10 can retain a computer device that can keep engagement relations at least at three locations, without depending on the outer shape of the computer device, and hence the extension device 10 can be reduced in size. Particularly, even when the size of the display panel 2 provided in the computer device 1 is increased or the width dimension W6 (see FIG. 1A) of the computer device 1 is increased with increase in the aspect ratio of the display panel 2, the extension device 10 does not have to be increased in size.

According to the present embodiment, since the computer device 1 includes the guide recess 5 and the extension device 10 includes the guide projection 18, when the computer device 1 is displaced from the state shown in FIG. 3 in the direction indicated by the arrow A, the computer device 1 is displaced in the direction indicated by the arrow A while the position thereof in the Y-axis direction is restricted. Thus, the extension device 10 can guide the computer device 1 to a normal mounted position in the extension device 10 without using the outer shape of the computer device 1. Due to such a configuration, the body retaining portion 11 of the extension device 10 can be made smaller than the outer shape of the computer device 1, and thus the extension device 10 can be reduced in size as compared to a configuration of an extension device that guides a main device to a normal mounted position by using the outer shape of the main device as in conventional art.

In addition, in the configuration of the extension device that guides the main device to the normal mounted position by using the outer shape of the main device as in the conventional art, when a plurality of types of main devices having different outer shapes are present, an extension device has to be manufactured for each main device, resulting in cost increase. In the present embodiment, since the computer device 1 includes the first positioning recess 3, the second positioning recess 4, and the guide recess 5 and the extension device 10 includes the first positioning projection 15, the second positioning projection 16, and the guide projection 18, when the position of each recess is set in a common manner in a plurality of types of main devices having different width dimensions and/or height dimensions of outer shapes, a plurality of types of main devices having different sizes of outer shapes can selectively be mounted on a single extension device. Therefore, the cost can be decreased.

According to the present embodiment, since the connector 19 is disposed on the back surface wall portion 17, the connector 19 faces laterally when the computer device 1 is mounted on the placement surface 11a of the extension device 10. Thus, foreign matters such as dust are unlikely to attach to the connector 19, and conduction failure and the like can be prevented. In the present embodiment, the configuration in which the connector 19 is provided on the back surface wall portion 17 of the extension device 10 has been described. However, when a connection terminal of the connected computer device 1 is present in the bottom surface 1d, even a configuration in which a connector is provided on the placement surface 11a is applicable. In order to avoid attachment of foreign matters such as dust to the connector in this configuration, for example, a cover member that opens in synchronization with placing the computer device 1 onto the placement surface 11*a* is provided, and the connector projects from the placement surface 11*a*. In addition, connectors may be provided on both the back surface wall portion 17 and the placement surface 11*a*.

Figure 5A:
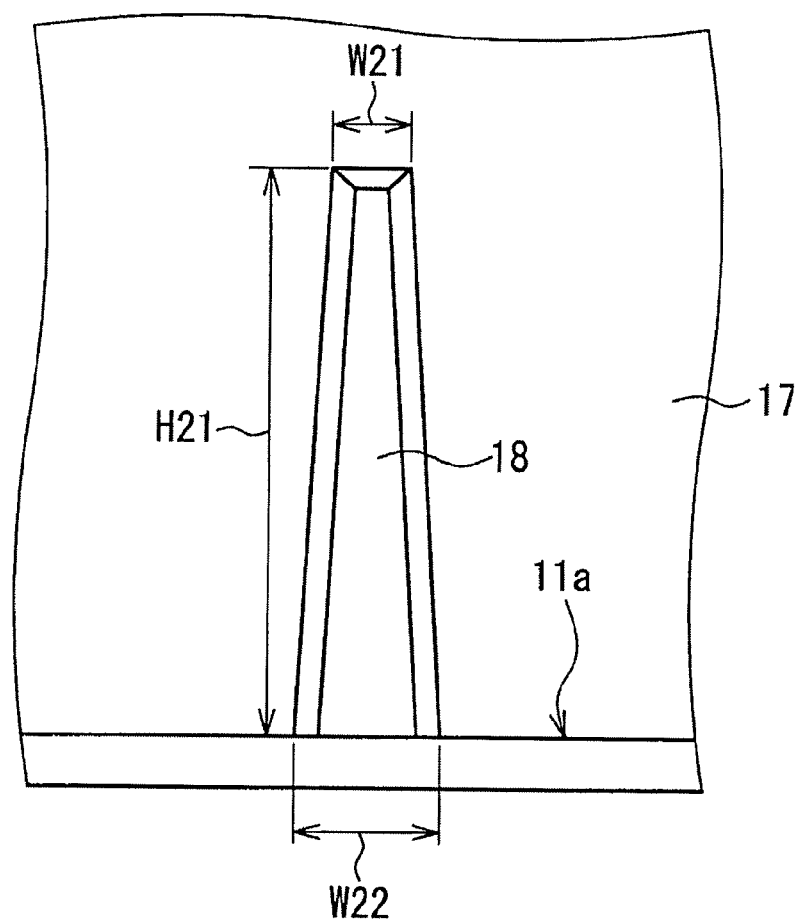
FIG. 5A is a front view of a principal portion showing a modified example of a guide projection.
Figure 5B:
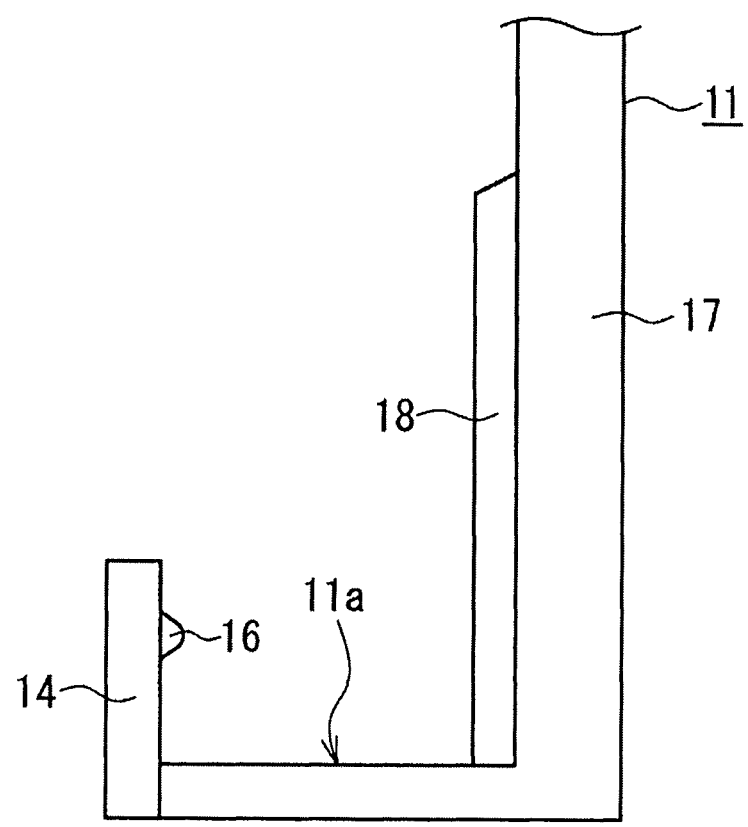
FIG. 5B is a side view of a principal portion showing the modified example of the guide projection.

In the present embodiment, the width dimension W11 (see FIG. 2A) of the guide projection 18 is uniform in the longitudinal direction of the guide projection 18, but may be non-uniform. FIG. 5A is a side view of a principal portion showing the configuration of a modified example of the guide projection 18. FIG. 5B is a side view of the guide projection 18 shown in FIG. 5A. In the guide projection 18 shown in FIG. 5A, the standing-provision width dimension W21 at one end in the longitudinal direction with respect to the wall surface 17*a* and the standing-provision width dimension W22 at the other end 11*a* in the longitudinal direction with respect to the wall surface 17*a* are set so as to have the following dimensional relation.

$$W21 < W22 \quad \text{relational expression (10)}$$

Due to the above dimensional relation, the width dimension of the guide recess 5 (see FIG. 1B) provided in the computer device 1 and the width dimension of the guide projection 18 have tolerances, and thus the guide recess 5 and the guide projection 18 can easily be caused to engage each other. Therefore, high position accuracy of both is not required when the computer device 1 is mounted onto the extension device 10, and thus the user can easily mount the computer device 1 to the extension device 10.

Further, the width dimension W22 of the guide projection 18 at the other end and the width dimension W1 (see FIG. 1B) of the guide recess 5 provided in the computer device 1 are set so as to have the following dimensional relation.

$$W1 \geq W22 \quad \text{relational expression (11)}$$

Due to the above dimensional relation, when the computer device 1 is placed at the normal mounted position in the extension device 10 as shown in FIGS. 4A to 4C, the gap between the guide recess 5 and the guide projection 18 can be made small, and looseness can be reduced when the computer device 1 is mounted on the extension device 10. Therefore, relative positional shift of the connector 6 and the connector 19 can be prevented, and conduction failure and the like can be prevented.

In addition, each of the first positioning projection 15, the second positioning projection 16, and the guide projection 18 preferably includes an inclined surface, since the first positioning recess 3, the second positioning recess 4, and the guide recess 5 are easily engaged when the computer device 1 is mounted on the extension device 10.

In the present embodiment, the body retaining portion 11 is fixed to the base 12, but may be rotationally supported by the base 12. In other words, the body retaining portion 11 is made rotatable such that an angle of the wall surface 17*a* of the back surface wall portion 17 becomes an arbitrary angle, whereby the angle of the computer device 1 can be adjusted to, for example, an angle at which the display panel 2 is easily viewed.

The extension device 10 may include a movable engagement member that is engageable with and disengageable from the computer device 1. For example, the back surface 1*b* of the computer device 1 includes an opening, and the back surface wall portion 17 includes a claw portion that is engageable with the opening. The claw portion is made displaceable between a position where the claw portion is engaged with the opening and a position where the claw portion is disengaged from the opening. Due to such a configuration, the computer device 1 mounted on the extension device 10 can be prevented from being easily dismounted therefrom by an outer shock or the like.

In the present embodiment, the computer device 1 includes recesses such as the first positioning recess 3 and the extension device 10 includes projections such as the first positioning projection 15. However, the computer device 1 may include projections, and the extension device 10 may include recesses. In addition, the front surface 1*a* of the computer device 1 may include projections, the back surface 1*b* of the computer device 1 may include a recess (the guide recess 5), the first wall portion 13 and the second wall portion 14 of the extension device 10 may include recesses, and the back surface wall portion 17 of the extension device 10 may include a projection (the guide projection 18). In addition, the front surface 1*a* of the computer device 1 may include recesses (the first positioning recess 3 and the second positioning recess 4), the back surface 1*b* of the computer device 1 may include a projection, the first wall portion 13 and the second wall portion 14 of the extension device 10 may include projections (the first positioning projection 15 and the second positioning projection 16), and the back surface wall portion 17 of the extension device 10 may include a recess.

In the present embodiment, the first wall portion 13 and the second wall portion 14 are formed independently of each other. However, a single wall portion may include the first positioning projection 15 and the second positioning projection 16.

In the present embodiment, the back surface wall portion 17 includes the single guide projection 18, but may include two or more guide projections. In the case of such a configuration, the computer device 1 includes at least two guide recesses in the back surface 1*b*.

In the present embodiment, the two positioning projections (the first positioning projection 15 and the second positioning projection 16) are provided at positions facing the back surface wall portion 17. However, three or more positioning projections may be provided. In the case of such a configuration, the computer device 1 includes at least three positioning recesses in the front surface 1*a*.

The computer device 1 is an example of a main device. The extension device 10 is an example of an extension device. The first positioning recess 3 and the second positioning recess 4 are examples of a first engagement portion and a second engagement portion. The guide recess 5 is an example of a third engagement portion. The placement surface 11*a* is an example of a placement portion. The first wall portion 13 and the second wall portion 14 are an example of a first wall portion. The back surface wall portion 17 is an example of a second wall portion. The first positioning projection 15 is an example of a first engaging portion. The second positioning projection 16 is an example of a second engaging portion. The guide projection 18 is an example of a third engaging portion. The number of each of the first engagement portion, the second engagement portion, the third engagement portion, the first engaging portion, the second engaging portion, and the third engaging portion is not limited to one. One long side of the pair of long sides of the placement surface 11*a* is an example of one edge side. The other long side of the pair of long sides of the placement surface 11*a* is an example of another edge side.

What is claimed is:

1. An information processing system including a main device that executes information processing and an extension device that is electrically connected to the main device and mechanically retains the main device, wherein the main device comprises:

a first engagement portion and a second engagement portion formed in a principal surface thereof; and a third engagement portion formed in another surface on the main-device side reverse from the principal surface, the extension device comprises:
- a placement portion on which the main device is placed;
- a first wall portion provided in a standing manner on one edge side of the placement portion;
- a second wall portion provided in a standing manner on another edge side of the placement portion that faces the one edge side;
- a first engaging portion formed in the first wall portion;
- a second engaging portion formed in the first wall portion; and
- a third engaging portion formed in the second wall portion; and when the main device is mounted on the extension device, the first engaging portion engages the first engagement portion, the second engaging portion engages the second engagement portion, and the third engaging portion engages the third engagement portion.

2. The information processing system according to claim 1, wherein
the first engaging portion and the second engaging portion are disposed as a pair of projections from the first wall portion, and
the first engagement portion and the second engagement portion are disposed as a pair of recesses that the pair of projections engage, respectively.

3. The information processing system according to claim 1, wherein
the third engaging portion is disposed as a projection from the second wall portion, and
the third engagement portion is disposed as a recess that the projection engages.

4. The information processing system according to claim 1, wherein the third engagement portion is formed at a position on the other surface in the main device which position corresponds to a portion between the first engagement portion and the second engagement portion.

5. The information processing system according to claim 1, wherein
the main device comprises a display panel disposed in the principal surface, and
when the main device is placed on a placement surface of the placement portion, a display surface of the display panel is disposed at a height equal to or higher than the height of the first wall portion from the placement surface.

6. The information processing system according to claim 1, wherein
in the extension device,
the height of the first wall portion from the one edge side is lower than the height of the second wall portion from the other edge side, and
the height of the first engaging portion and the second engaging portion from the one edge side is lower than the height of the third engaging portion from the other edge side,
the main device comprises a bottom surface that is brought into contact with the placement surface, and
the third engagement portion is disposed at a position where the bottom surface is in contact with the other surface.

7. An extension device that is electrically connected to and mechanically retains a main device that includes a first engagement portion and a second engagement portion formed in a principal surface and a third engagement portion formed in another surface on the main-device side reverse from the principal surface, the extension device comprising:
- a placement portion on which the main device is placed;
- a first wall portion provided in a standing manner on one edge side of the placement portion;
- a second wall portion provided in a standing manner on another edge side of the placement portion that faces the one edge side;
- a first engaging portion formed in the first wall portion;
- a second engaging portion formed in the first wall portion; and
- a third engaging portion formed in the second wall portion, wherein when the main device is placed on the placement portion, the first engaging portion engages the first engagement portion, the second engaging portion engages the second engagement portion, and the third engaging portion engages the third engagement portion.

8. The extension device according to claim 7, wherein
the first engaging portion and the second engaging portion are disposed as a pair of projections from the first wall portion, and
the first engagement portion and the second engagement portion are disposed as a pair of recesses that the pair of projections engage, respectively.

9. The extension device according to claim 7, wherein
the third engaging portion is disposed as a projection from the second wall portion, and
the third engagement portion is disposed as a recess that the projection engages.

10. The extension device according to claim 7, wherein the third engagement portion is formed at a position on the other surface in the main device which position corresponds to a portion between the first engagement portion and the second engagement portion.

* * * * *